Oct. 17, 1967  E. BAER ETAL  3,347,786
PROCESS FOR PURIFYING WATER USING REFORMING
OF METAL HYDROXIDE FLOCCULATION AGENT
Filed June 25, 1965
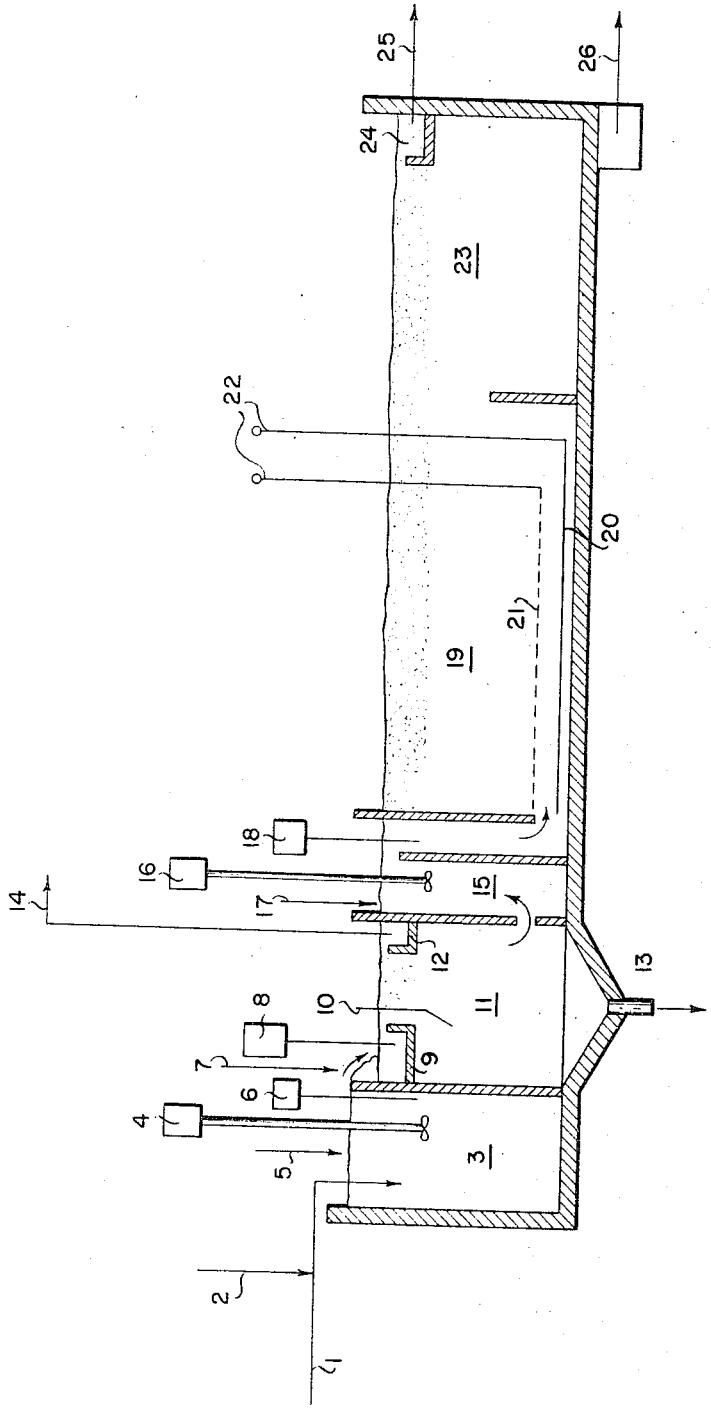
INVENTORS
*Erhardt Baer*
*Kurt Xylander*
BY
ATTORNEY

United States Patent Office 3,347,786
Patented Oct. 17, 1967

3,347,786
PROCESS FOR PURIFYING WATER USING RE-FORMING OF METAL HYDROXIDE FLOCCU-LATION AGENT
Erhardt Baer, Sophienstr. 52, and Kurt Xylander, Libel-lenweg 56, both of Frankfurt am Main, Germany
Filed June 25, 1965, Ser. No. 510,995
Claims priority, application Germany, June 30, 1964, Z 10,946
10 Claims. (Cl. 210—45)

The clarification of waste waters, containing the impurities, e.g., dirt, in finely dispersed form by the addition of a flocculation agent, such as a metal salt, for example, and the setting of a certain pH value, depending on the kind of metal salt, is known. Such colloidal or emulsified mixtures cannot be separated without a flocculation agent, or with centrifuges, filters or similar apparatus.

Very dirty waste waters, or those with a very high content in detergents or emulsifiers, for their clarification require a relatively great amount of flocculation agent. For the clarification of a normally dirty river water, about 100 grams of aluminum sulfate per cubic meter suffices for flocculating and clarifying. On the other hand, up to 10 kilograms of flocculation agent per cubic meter must be added to the waste waters of the automobile industry, which contain several percent of detergent or strong emulsifier. A part of the waste water is clarified in this way, it is true, but a relatively large volume of slime is also formed simultaneously, which may be up to 90% of the original waste water. This is because a large amount of water is taken up for the absorption of the necessary flocculation of dirt. If the slime is to be destroyed by burning, the water must first be evaporated, since the cost of apparatus for a preliminary concentration of the slime by centrifuges, filters, etc., would be prohibitive.

This invention is aimed at considerably reducing the amounts of metal salt heretofore needed to clarify a waste water, in order to save costs and to obtain a slime in as concentrated a form as possible, which can be burned without the addition of energy. It is also intended that the metal salt used can be recovered so far as possible and reused in the process.

The purity of the clear water produced should of course correspond as nearly as possible to the prescriptions of the authorities for introduction into a drainage system.

Referring now to the drawing, the figure there shown is a diagrammatic schematic representation of the process of the present invention as applied in the form of a continuous operation to the purification of waste water or other impure water for purposes of purifying the same to render it economically useful.

The subject matter of the present invention is a process for the purification of waste waters by the addition of metal salts or metal oxides and the flocculation of same as their hydroxide by setting a suitable corresponding pH in the waste water, with the distinction that: (1) the metal hydroxide after the first flocculation is redissolved; (2) the pH value of the waste water, after the removal of the separated impurities, is again set to the flocculation point, and (3) the alternation of precipitation, re-dissolving and separation of the impurities is repeated as many times as necessary.

With this process it is unnecessary to add as much metal salt as would be necessary for a complete precipitation of the impurities in a single step. Only a fraction of this, for example, a third, suffices. With the first flocculation, it is true, no clean, clear water is obtained. If the precipitated metal hydroxide is dissolved again, the impurities adsorbed by the hydroxide will be separated, according to their difference in density from the dispersion agent, upward or downward. Too much agitation should be avoided, so as not to disperse the once separated impurities again. The dirt, which accumulates on the surface or at the bottom, is then removed in the manner known per se. By setting the corresponding pH, the hydroxide can then be precipitated again, which in turn adsorbs a corresponding amount of impurities from the waste water. According to the amount and kind of impurities, the procedure of precipitation, re-dissolving and separation of the impurities must be repeated one or more times, until the water has reached the necessary degree of purity. The settled slime phase and the clear phase above it may then be separated. The metal slime, especially the aluminum hydroxide slime, from the last precipitation can be used again directly for the treatment of newly arriving waste water, if its pH is such that the hydroxide will be immediately dissolved again in the waste water. The metal content of this slime may also be used, however, by converting it, by the addition of an acid or alkali in known manner, into the metal salt, which can then be used for further precipitations. The impurities, which are introduced into the newly arriving waste water by this re-use of the hydroxide slime from the last precipitation, are negligible, because the total impurities in the last dissolving and re-flocculating step is only relatively slight. For the same reasons, the slime also settles perfectly while, in the known process, the separation direction often changes because of the different specific weights of the impurities.

To prevent too great oversalting in a precipitation and redissolving when repeated several times, care should be taken that the acid used for dissolving the hydroxide precipitate forms, with the alkali used for neutralizing and re-precipitating the metal salt, an insoluble compound, as is the case, for example, when using sulfuric acid as the acid and milk of lime as the alkali.

The especially hard-to-purify waste waters of the auto industry, which consist, for example, of the washing water and bore emulsions, present particular difficulties in clarification because of their high content of mineral oils and detergents or emulsifiers. These waste waters are usually alkaline. In such and other alkaline waste waters, it is recommended that, for the first precipitation, a metal salt be used which precipitates a hydroxide at about the pH range of the waste water, and then, for the last precipitation, that a metal salt be used of which the hydroxide precipitates at a lower pH value. For example, in the case of a waste water with a pH of about 11, magnesium salts may be used for the precipitation in the first and following steps, and only in the last step has the pH fallen low enough so that the hydroxide of the second metal salt precipitates. This salt, for example, an aluminum or iron salt, may be added just before the last precipitation step, or it may be added even before the first precipitation step with the magnesium salt. This procedure has the advantage of only a very slight consumption of the relatively expensive aluminum salts but, for the last precipitation step, advantage is still taken of the especially good adsorption power of the aluminum hydroxide. A further saving in cost is permitted by the fact that the metal hydroxide slime from the last precipitation step, that is, the aluminum or iron hydroxide, can be used for the treatment of newly arriving waste water. Moreover, in this variant of the process of the present invention, the total clarification of the alkaline waste water takes place in an alkaline to neutral range. In this way there is rendered superfluous a final neutralization before discharging the clarified water to the drainage, and the costs of a plant for carrying out this variation of the present process are much lower because the tanks need not be of acid-resistant material.

In the plural-step precipitation process according to the invention, according to the pH value of the waste water to be clarified, combinations of metal salts other than magnesium and aluminum or iron, e.g., iron sulfate, may be used, such as the combination of iron with aluminum, for example. Because of the demonstrated possibility of re-using the metal hydroxide from the preceding and especially the last precipitation step, salts of metals may be used which could not be considered heretofore for reasons of cost. By the process according to this invention, the requirements which have been set up for the clarification of hard-to-purify waste waters, in which the impurities are present in colloidal form, can be fully met, since the amount of metal salt needed in the plural-step process is much less than in a single precipitation process. The impurities are separated in very concentrated form. The dirt removed has only a slight water content, and therefore can easily be burned. The main portion of the impurities is drawn off in a form which contains practically no compounds of the metal employed for precipitation, so that this reagent is not lost. The metal hydroxide slime is only drawn off in the last step, at which point the waste water is already substantially clarified, so that the slime, which settles well at that point, contains only relatively small amounts of impurities and can be used again. By the process according to this invention, it is possible to clarify waste waters with a mineral oil content of 2% and more, as well as a high content of surface-active substances besides, down to a residual content of 50 to 80 milligrams per liter of impurities extractable with ether. In cases where this residual content does not suffice, the last precipitation may be followed by a purification, after separation of the hydroxide slime, e.g., with activated carbon powder and flocculation additives known per se, or by coagulation. The active carbon is stirred into the fluid. By the addition of the flocculation additive, the dispersed activated carbon particles then agglomerate into larger units and settle in a few minutes. The sediment can be burned after separating. The purified water corresponds to the strictest official specifications for discharge into a public drainage system, with residual content in ether-extractable substances below 10 milligrams per liter.

For a more rapid separation of the hydroxide flakes precipitated in the last step, an electrolytic flotation process may be used. For this purpose, two electrodes are placed opposite each other in the separating tank, of which the upper one is perforated. Since the previously purified waste water acts as electrolyte, fine gas bubbles occur on the surfaces of the electrodes, which quickly settle on the dirt-laden hydroxide flakes and drive them upward. The result is a much more rapid and complete separation of hydroxide flakes and water, as well as a higher concentration in solids of the floating slime.

This slime separation by flotation is sufficiently effective, since even particles which are normally heavier than water, and thus ordinarily sink, are quickly driven upward by the bubbles.

This process may be used, therefore, also in the subsequent steps for a quicker separation of the solids set free (demulsified) by a re-dissolving of the hydroxide flakes. In this way, likewise, a more rapid and complete separation is effected.

The alternation of precipitation, re-dissolving and separation of the impurities in the several steps of the process of this invention may be conducted fully automatically. Even with a larger number of steps, the process of this invention usually takes less time for purifying of the same amount of waste water than a single precipitation process, because the separation of impurities in the several steps and the separation of the metal hydroxide slime from the last step are always attained quite rapidly. Therefore, with this new process, greater amounts of waste water can be clarified in the same time.

The process of this invention is not limited to the treatment of waste waters. It is equally suitable for treating other impure or dirty waters, for example, for the removal of radioactive ingredients from water or for the production of water for drinking or other economic or commercial uses from river or sea water.

Example 1 [1]

A waste water with a mineral oil content of 2%, a pH value of 11.5 and a high content of detergents and emulsifiers was treated with 3 kilograms of $Al_2(SO_4)_3 \cdot 18H_2O$ per cubic meter, and the aluminum hydroxide precipitated by the addition of 1.5 kilogram sulfuric acid per cubic meter. The water was still very turbid. The aluminum hydroxide was then dissolved again by the addition of 0.3 kilogram sulfuric acid per cublic meter. After standing one hour, 25 liters per cubic meter of floating slime had separated. This was removed and, by setting a pH value of 6.5, the aluminum hydroxide was precipitated again. After a standing time of several hours the water was completely clear and the slime portion amounted to 90 liters per cubic meter. The clear phase, after removing the slime, still had a content of 60 milligrams per liter ingredients extractable with ether. After the addition of 0.5 kilogram of activated carbon powder per cubic meter, thorough distribution of same, and addition of 3 cubic centimeters Separan (trademark) a known flocculation additive, per cubic meter, as well as removal of the active carbon sediment, the clarified water still had a content in ether-extractable ingredients of 8.5 milligrams per liter.

Example 2

The same waste water was treated with 2 kilograms of magnesium sulfate per cubic meter. The pH value fell to about 11.2. The magnesium hydroxide was precipitated at once; the water was still turbid.

By the addition of 1.1 kilogram sulfuric acid, the magnesium hydroxide was dissolved again. After standing 1 hour, 25 liters of floating slime per cubic meter had separated. This was removed, and then 1 kilogram $Al_2(SO_4)_3 \cdot 18H_2O$ added. A pH value was set of 6.5. After standing several hours, the water was completely clear and the slime part was 90 liters per cubic meter.

Example 3

In another test, two plate-shaped electrodes, of which the upper one was perforated, were placed in the waste water on the floor of the settling tank, one above the other, but electrically insulated from each other. The electrolyte content of the waste water caused the electrolytic development of small gas bubbles after applying a direct voltage of about 20 volts.

The procedure was now as in the second example; that is, flocculation by adding 2 kilograms of $MgSO_4$ and then re-dissolving of the magnesium hydroxide by means of sulfuric acid. Then current was fed to the two electrodes for 5 minutes. The resultant electrolyte gas caused the demulsified particles to move upward quickly. After 5 more minutes of standing time, 25 liters of floating slime per cubic meter had come to the top. Thus, after 10 minutes, by the aid of electrolysis, the same effect was attained as after an hour in the preceding test.

After the addition of 1 kilogram of $Al_2(SO_4)_3 \cdot 18H_2O$, and lowering of the pH value to 6.5, the magnesium hydroxide was dissolved again and aluminum hydroxide precipitated.

The water-flake mixture was then exposed to the electrolysis gas by turning on the current for 5 minutes. After 5–10 minutes more, all the aluminum hydroxide flakes had moved upward. The water was completely clear and the slime part amounted to 60 liters per cubic meter.

A continuous operation of the process according to this

---

[1] As flocculation agents, also others than mentioned metal salts, or also earth alkaline metal oxides, for example $Ca(OH)_2$, or combinations of metal salts and oxides, may be used in the process of this invention.

invention will be explained below, with reference to the figure of the attached drawings:

The incoming waste water (line 1) is treated through a dosing line 2 with metal salt and mixed in chamber 3. The pH value necessary for the precipitation of the metal salt in question is adjusted through feed 5 according to the pH measurement 6 by means of a regulating device.

The fluocculated waste water arrives by an overflow dam into the channel 9 where, by means of a dosing device 7, controlled by the pH measuring or regulating device 8, an acid or an alkali is fed, in order to re-dissolve the hydroxide precipitated in the chamber 3. The water can stand in the chamber 11 while the heavy components sink into the funnel 13 and the floating components are collected in the channel 12. The deposited or floating slime is drawn off through line 13 or 14, as the case may be. The partition wall 10 serves as a conduction surface for the incoming water. From chamber 11 the pre-purified water flows into the chamber 15, whereby dosing with an acid or alkali through line 17 and corresponding pH value regulation 18, the flocculation pH value is set again. The agitator 16 serves to mix the acid or alkali. The flocculate and water mixture then proceeds into the flotation cell 19, where the metal hydroxide is floated by the very fine gas bubbles resulting in the electrolysis. The electric current is fed through connection 22. The electrode 21, located above the electrode 20 is perforated, so that the gas bubbles leaving the electrode 20 can pass through the electrode 21.

The waste water then reaches a standing zone 23. The slime floated in the electrolysis is drawn off through channel 25, while the clarified waste water can be removed from line 26 and conducted into the drainage.

In cases where two different metal salts are used, for example, magnesium sulfate and aluminum sulfate, in the the case of alkaline waste waters, the magnesium sulfate is added through dosing line 2. Since magnesium precipitates in a very wide range (pH 10–13), the pH regulation 6 is superfluous when the waste water is very alkaline. After adding an acid through dosing device 7 and pH regulation, 8 the magnesium sulfate is dissolved at about pH 8. The broken, but no longer flocculated emulsion is then subjected to a preliminary purification in chamber 11, in which the heavy components sink (into funnel 13) and the light components, such as floating oil, for example, quickly rise and can be drawn off through the line 14. In the chamber 15, after adding aluminum sulfate and setting the pH value for flocculation (about 5.5–7.5) there is another flocculation by addition of an acid. In the flotation cell 19, then, as already described, the corresponding aluminum hydroxide flakes are separated from the water.

If the hydroxide slime drawn from the line 25 is dissolved with 2% by volume concentrated sulfuric acid, the dirt particles themselves are separated. After their removal, the remaining dissolved aluminum sulfate can be added, instead of fresh aluminum sulfate, through the dosing line 2 or through dosing line 17 to the waste water again.

The separation of the dirt particles separated in the tank 11 is greatly accelerated when, as in the flotation tank 19, the electrodes are arranged one above the other, the upper being perforated. In this case, even the solid particles settling downward are floated upward by the gas bubbles, where they can be deposited together with the rest of the floated slime.

It is to be understood that the invention is not to be limited to the exact procedure, details of operation or exact compounds, compositions, or materials shown and described, as obvious modifications and equivalents will be apparent to one skilled in the art, and the invention is therefore to be limited only by the scope of the appended claims.

We claim:

1. A process for purifying water which comprises providing a metal hydroxide in flocculated form in said water thereby causing a portion of the impurities contained in said water to separate therefrom, adjusting the pH value of the water to dissolve said hydroxide, removing the separated impurities from said water, readjusting the pH value of said water to reform said metal hydroxide flocculate thereby causing an additional portion of the remaining impurities of said water to separate therefrom, and removing said additional separated impurities from said water.

2. A process for purifying water which comprises adding a soluble metal salt to said water and providing said water with a pH value sufficient to cause flocculation of the metal of said metal salt as a metal hydroxide, thereby causing a portion of the impurities of said water to separate therefrom, adjusting the pH value of said water to redissolve said metal hydroxide, removing the separated impurities from said water, readjusting the pH value of said water to reform said metal hydroxide flocculate thereby causing an additional portion of the impurities of said water to be additionally separated therefrom, and removing said separated impurities, the cycle comprising flocculation, dissolution, and removal of separated impurities being repeated if necessary for said water to reach a desired degree of purity.

3. A process of claim 2 wherein the amount of metal salt added is less than that required to cause complete purification of said water in a single flocculation step.

4. A process of claim 2 wherein said impure water is initially alkaline, wherein a metal salt is used for the first flocculation step the hydroxide of which precipitates at the initial pH value of said water and wherein for the final flocculation step, a metal salt is used the hydroxide of which precipitates at a pH value lower than the initial pH of said impure water.

5. A process of claim 2 wherein the removal of the hydroxide slime of the final precipitation is followed by purification of the remaining water with activated carbon powder and a flocculation additive.

6. A process of claim 2 wherein the further separation of the impurities separated during the purification process is effected by the application of gas which is electrolytically produced within said water.

7. A process of claim 2 wherein the metal hydroxide slime from the last precipitation is recycled for treating subsequently introduced impure water.

8. A process of claim 2 wherein said metal salt is aluminum sulfate.

9. A process of claim 2 wherein said metal salt is magnesium sulfate.

10. A process of claim 2 wherein said metal salt is an iron salt.

References Cited

UNITED STATES PATENTS

| 1,069,169 | 8/1913 | Parker | 210—47 X |
| 2,128,569 | 8/1938 | Velz | 210—46 |

FOREIGN PATENTS

| 3,252 | 6/1883 | Great Britain. |

OTHER REFERENCES

Hathaway, C. W., Treatment of Machine Shop Wastes Containing Emulsified Oils, Sewage and Industrial Wastes, February 1955, vol. 27, pp. 198–205.

MORRIS O. WOLK, Primary Examiner.

MICHAEL E. ROGERS, Examiner.